United States Patent [19]

Hefner, Jr. et al.

[11] Patent Number: 4,699,933
[45] Date of Patent: Oct. 13, 1987

[54] POLYURETHANES CONTAINING TRIAZINE OR BOTH TRIAZINE AND OXAZOLINE, TRIAZINE AND IMINO CARBAMATE OR TRIAZINE AND OTHER N-HETEROCYCLIC GROUPS

[75] Inventors: Robert E. Hefner, Jr.; Mary N. White, both of Lake Jackson, Tex.

[73] Assignee: The Dow Chemical Company, Midland, Mich.

[21] Appl. No.: 918,736

[22] Filed: Oct. 14, 1986

Related U.S. Application Data

[63] Continuation-in-part of Ser. No. 794,370, Nov. 4, 1985, abandoned.

[51] Int. Cl.$^4$ .............................................. C08G 18/14
[52] U.S. Cl. ................................ 521/166; 525/326.7; 525/523; 525/533; 525/534; 528/73; 528/96; 528/99; 528/119; 528/210; 528/211; 544/193
[58] Field of Search ................... 521/166; 528/73, 96, 528/119, 211, 99, 210; 525/326.7, 523, 533, 534; 544/193

[56] References Cited

U.S. PATENT DOCUMENTS 4,487,915 12/1984 Hefner .................................. 528/96
4,489,202 12/1984 Hefner .................................. 528/95
4,555,553 11/1985 Hefner ................................ 525/523

*Primary Examiner*—Maurice J. Welsh
*Attorney, Agent, or Firm*—Butler & Binion

[57] ABSTRACT

The present invention is directed to polyurethane compositions containing triazine or both triazine and oxazoline or imino carbamate groups which are prepared by reacting:

1.
   (a) at least one alkoxylated hydroxy aromatic oligomer containing at least one triazine group, or
   (b) at least one alkoxylated hydroxy aromatic oligomer containing at least one triazine group and at least one oxazoline group, or
   (c) at least one alkoxylated hydroxy aromatic oligomer containing at least one triazine group and at least one imino carbamate group, or
   (d) at least one alkoxylated hydroxy aromatic oligomer containing at least one triazine group and at least one other N-heterocyclic group, or
   (e) a mixture of the above and
2. at least one material having more than one isocyanate group per molecule
   wherein the components are employed in proportions which provide a ratio of isocyanate groups to hydroxy groups of from about 0.05:1.0 to about 10.0:1.0, preferably from about 0.95:1.0 to about 1.5:1.0.

29 Claims, No Drawings

POLYURETHANES CONTAINING TRIAZINE OR BOTH TRIAZINE AND OXAZOLINE, TRIAZINE AND IMINO CARBAMATE OR TRIAZINE AND OTHER N-HETEROCYCLIC GROUPS

RELATED APPLICATIONS

This application is a continuation-in-part application of application Ser. No. 794,370, filed Nov. 4, 1985 by Hefner, Jr. now abandoned.

Oligomers containing triazine groups are disclosed by Hefner, Jr. in (application Ser. No. 547,537, filed Oct. 31, 1983) U.S. Pat. No. 4,489,202.

Oligomers containing triazine and oxazoline groups are disclosed by Hefner, Jr. in (application Ser. No. 576,304, filed Feb. 2, 1984) U.S. Pat. No. 4,487,915.

Oligomers containing triazine and imino carbamate groups are disclosed by Hefner, Jr. in (application Ser. No. 702,699, filed Feb. 15, 1985) U.S. Pat. No. 4,555,553.

Oligomers containing triazine groups and N-heterocyclic groups derived from reaction of maleimide and cyanate groups are disclosed by Hefner, Jr. in application Ser. No. 831,947, filed Jan. 2, 1986, and now U.S. Pat. No. 4,663,398.

BACKGROUND OF THE INVENTION

I. Field of the Invention

The present invention is directed to novel polyurethane compositions containing triazine groups or both triazine and oxazoline, triazine and imino carbamate or triazine and other N-heterocyclic groups.

II. Prior Art

Polyurethane are the reaction product of a polyol and polyisocyanate. Various methods for the synthesis of polyurethanes are disclosed in *Polyurethane Elastomers* published by Applied Science Publishers (1982).

Preparation of poly(triazine urethane)-polybutadiene block copolymers is taught by Babchinitser et al in *Polymer Communications*, vol. 25, pages 229–231, August (1984). These materials are prepared using a triazine-containing diol which is monomeric, that is, it structurally consists of a single triazine nucleus to which a pair of hydroxyalkyl groups are chemically linked.

SUMMARY OF THE INVENTION

The present invention is directed to polyurethane compositions containing triazine or both triazine and oxazoline, triazine and imino carbamate or triazine and other N-heterocyclic groups which are prepared by reacting:

1.
  (a) at least one alkoxylated hydroxy aromatic oligomer containing at least one triazine group, or
  (b) at least one alkoxylated hydroxy aromatic oligomer containing at least one triazine group and at least one oxazoline group, or
  (c) at least one alkoxylated hydroxy aromatic oligomer containing at least one triazine group and at least one imino carbamate group, or
  (d) at least one alkoxylated hydroxy aromatic oligomer containing at least one triazine group and at least one other N-heterocyclic group, or
  (e) a mixture of the above and
2. at least one material having more than one isocyanate group per molecule wherein the components are employed in proportions which provide a ratio of isocyanate groups to hydroxy groups of from about 0.05:1.0 to about 10.0:1.0, preferably from about 0.95:1.0 to about 1.5:1.0.

DETAILED DESCRIPTION OF THE INVENTION

The polyurethanes of the present invention are formed by the following procedure:

I. Preparing a hydroxy aromatic oligomer containing triazine groups. Specifically, the oligomer may contain a triazine group, a triazine and oxazoline or a triazine and imino carbamate or a triazine and other N-heterocyclic groups;

II. Alkoxylating the oligomers containing the triazine groups by reacting with an alkylene oxide or mixture of alkylene oxides; and III. Forming a polyurethane by reacting 1.
2. (a) at least one alkoxylated hydroxy aromatic oligomer containing at least one triazine group, or
  (b) at least one alkoxylated hydroxy aromatic oligomer containing at least one triazine group and at least one oxazoline group, or
  (c) at least one alkoxylated hydroxy aromatic oligomer containing at least one triazine group and at least one imino carbamate group, or
  (d) at least one alkoxylated hydroxy aromatic oligomer containing at least one triazine group and at least one other N-heterocyclic group
  (e) a mixture of the above; and
2. at least one material having more than one isocyanate group per molecule wherein the components are employed in proportions which provide a ratio of isocyanate groups to hydroxy groups of from about 0.05:1.0 to about 10.0:1.0, preferably from about 0.95:1.0 to about 1.5:1.0.

Preparation of Oligomer

Suitable materials having an average of more than one aromatic hydroxyl group per molecule which can be employed to prepare the cyanate mixture precursor to each of the triazine functional oligomers, include, for example, those represented by the formulas:

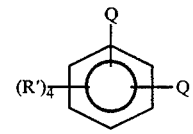

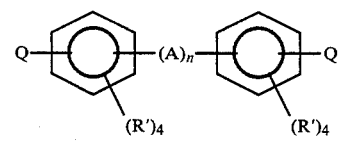

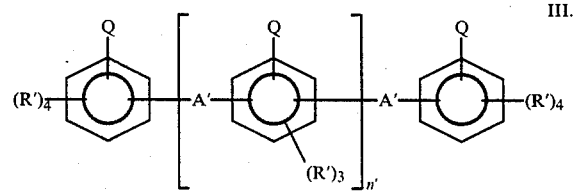

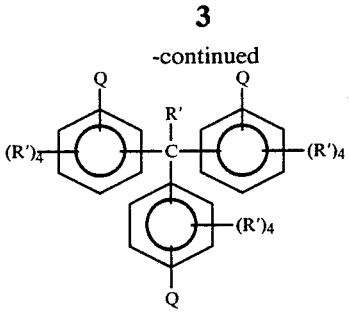

and the like, wherein Q is an —OH group; each A is independently a divalent hydrocarbon group having from 1 to about 12 preferably from 1 to about 6 carbon atoms, a direct bond,

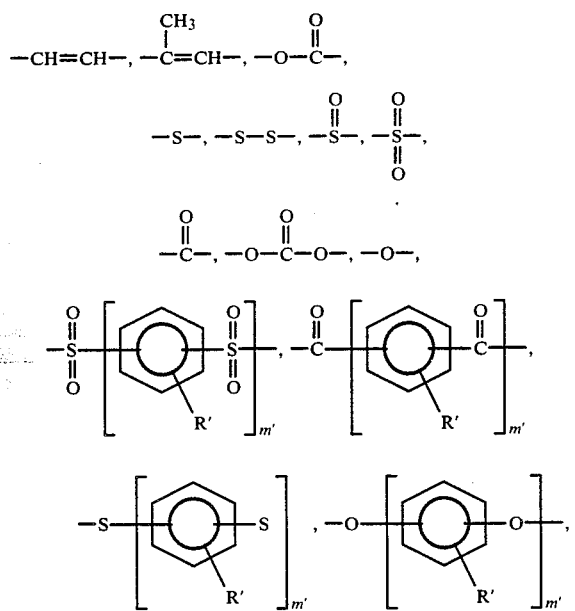

and the like; each A' is independently a divalent hydrocarbon group having from 1 to about 3, preferably 1, carbon atoms or a

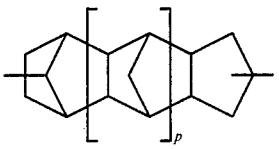

group; each R' is independently hydrogen or a hydrocarbyl or hydrocarbyloxy group having from 1 to about 6 carbon atoms or a halogen, preferably chlorine or bromine; m' has a value from 1 to about 100, preferably from 1 to about 10; n has a value of zero or 1; n' has a value from about 0.001 to about 6; and p has a value of from zero to about 10, preferably from zero to 3.

Particularly suitable aromatic hydroxyl-containing compounds include, for example, o-, m- and p-dihydroxybenzene, 2-tert butyl hydroquinone, 2,4-dimethyl resorcinol, 2,5-ditert butyl hydroquinone, tetramethyl hydroquinone, 2,4,6-trimethyl resorcinol, 4-chlororesorcinol, 4-tert butyl pyrocatechol, 1,1-bis(4-hydroxyphenyl)ethane; 2,2-bis(4-hydroxyphenyl)propane; 2,2-bis(4-hydroxyphenyl)pentane; bis(4,4'-dihydroxydiphenyl)methane, 2,2'-dihydroxydiphenyl, 4,4'-dihydroxydiphenyl, 4,4'-dihydroxy-α-methylstilbene, 4,4'-dihydroxy stilbene, 3,3'-,5,5'-tetramethyl-4,4'-dihydroxydiphenyl, 3,3',5,5'-tetrachloro-4,4'-dihydroxydiphenyl, 3,3'5,5'-tetrachloro-2,2'-dihydroxydiphenyl, 2,2',6,6'-tetrachloro-4,4'-dihydroxydiphenyl,4,4'-bis([3-hydroxy]phenoxy)-diphenyl, 4,4'-bis([4-hydroxy]phenoxy)-diphenyl, 2,2'-dihydroxy-1,1'-binaphthyl, and other dihydroxydiphenyls; 4,4'-dihydroxydiphenyl ether, 3,3',5,5'-tetramethyl-4,4'-dihydroxydiphenyl ether, 3,3',5,5'-tetrachloro-4,4'-hydroxydiphenyl ether, 4,4'-bis(p-hydroxyphenoxy)-diphenyl ether, 4,4'-bis(p-hydroxyphenyl isopropyl)-diphenyl ether, 4,4'-bis(p-hydroxyphenoxy)benzene, 4,4'-bis(p-hydroxyphenoxy)-diphenyl ether, 4,4'-bis(4[4-hydroxyphenoxy]phenyl sulfone)-diphenyl ether, and other dihydroxydiphenyl ethers; 4,4'-dihydroxydiphenyl sulfone, 3,3',-5,5'-tetramethyl-4,4'-dihydroxydiphenyl sulfone, 3,3'5,5'-tetrachloro-4,4'-dihydroxydiphenyl sulfone, 4,4'-bis(p-hydroxyphenyl isopropyl)-diphenyl sulfone, 4,4'-bis-([4-hydroxyl]-phenoxy)-diphenyl sulfone, 4,4'-bis([3-hydroxy]-phenoxy)-diphenyl sulfone, 4,4'-bis(4-[4-hydroxyphenylisopropyl]-phenoxy)-diphenyl sulfone, 4,4'-bis(4[4-hydroxy]-diphenoxy)-diphenyl sulfone, and other diphenyl sulfones; 4,4'-dihydroxydiphenyl methane, 4,4'-bis(p-hydroxyphenyl)-diphenyl methane, 2,2'-bis(p-hydroxyphenyl)-propane, 3,3',5,5'-tetramethyl-2,2'-bis(p-hydroxyphenyl)-propane, 3,3',5,5'-tetrachloro-2,2'-bis(p-hydroxyphenyl)-propane, 1,1-bis(p-hydroxyphenyl)-cyclohexane, bis-(2-hydroxy-1-naphthyl)-methane, 1,2-bis(p-hydroxyphenyl)-1,1,2,2-tetramethyl ethane, 4,4'-dihydroxybenzophenone, 4,4'-bis(4-hydroxy)phenoxy-benzophenone, 1,4-bis(p-hydroxyphenyl isopropyl)-benzene, phloroglucinol, pyrogallol, 2,2',5,5'-tetrahydroxy-diphenyl sulfone, other dihydroxydiphenyl alkanes, mixtures thereof and the like.

Suitable cyanogen halides which can be employed to prepare the cyanate mixture precursor include, for example, cyanogen chloride, cyanogen bromide, mixtures thereof and the like.

If desired, the method reported in *Organic Synthesis*, Vol 61, page 35–67 (1983), published by John Wiley & Sons, may be used to generate the required amount of cyanogen halide in situ, although this is less preferred than using neat cyanogen halide.

Suitable base materials which can be employed to prepare the cyanate mixture precursor include both inorganic bases and tertiary amines, such as, for example, sodium hydroxide, potassium hydroxide, triethylamine, pyridine, lutidine, mixtures thereof and the like. The tertiary amines are most preferred as the base material.

Reaction to provide the cyanate mixture is usually conducted at a temperature of from about −40° C. to about 60° C., preferably from about −20° C. to about 25° C. for from about 10 minutes (600 s) to about 120 minutes (7200 s), preferably from about 10 minutes (600 s) to about 60 minutes (3600 s).

If desired, the reaction to provide the cyanate mixture can be conducted in the presence of an inert solvent reaction medium. Suitable such solvents include, for example, water, chlorinated hydrocarbons, ketones, mixtures thereof and the like.

(a) Oligomers Containing Triazine Groups Oligomers containing triazine groups are prepared by
  I. reacting (A) at least one material having an average of more than one aromatic hydroxyl group per molecule with (B) at least 0.01 but not more than 0.95, preferably from about 0.05 to about 0.55, mole of at least one cyanogen halide per aromatic hydroxyl group in the presence of (C) a suitable base in a quantity of from about 0.01 to about 1.1, preferably from about 0.05 to about 0.6, moles per aromatic hydroxyl group at a temperature and time sufficient to essentially complete the reaction and thereafter recovering the resultant cyanate mixture; and II. trimerizing the product resulting from (I) in the presence of a suitable trimerization catalyst at a temperature and time to essentially complete the trimerization reaction.

Suitable trimerization catalysts which can be employed for conversion of the cyanate mixture to triazine functional oligomers include, for example, metal salts of carboxylic acids, such as, for example, lead octoate, zinc stearate, zinc acetylacetonate, at concentrations of about 0.001 to 5 percent. Most preferred catalysts are cobalt naphthenate and cobalt octoate, mixtures thereof and the like.

The trimerization reactin is usually conducted at a temperature of from about 70° C. to about 250° C., preferably from about 70° C. to about 200° C. for a period of from about 15 minutes (900 s) to about 120 minutes (7200 s), preferably from about 30 minutes (1800 s) to about 75 minutes (4500 s). These reactions are preferably performed in the presence of the aforementioned catalyst(s).

(b) Oligomers Containing Triazine and Oxazoline Groups

Oligomers containing both triazine and oxazoline groups are prepared by

I. reacting (A) at least one material having an average of more than one aromatic hydroxyl group per molecule with (B) at least 0.01 but not more than 0.95, preferably from about 0.05 to about 0.55, mole of at least one cyanogen halide per aromatic hydroxyl group in the presence of (C) a suitable base in a quantity of from about 0.01 to about 1.1, preferably from about 0.05 to about 0.6, moles per aromatic hydroxyl group at a temperature and time sufficient to essentially complete the reaction and thereafter recovering the resultant cyanate mixture; and II. co-oligomerizing the product resulting from (I) by reacting with (D) an epoxy resin wherein the mole ratio of epoxy groups to cyanate groups is from about 1:10 to about 1:100, preferably from about 1:15 to about 1:40 in the presence of a suitable co-oligomerization catalyst at a temperature and time to essentially complete the co-oligomerization reaction.

Suitable epoxy resins for co-oligomerization with the cyanate mixture are those represented by the following formulas:

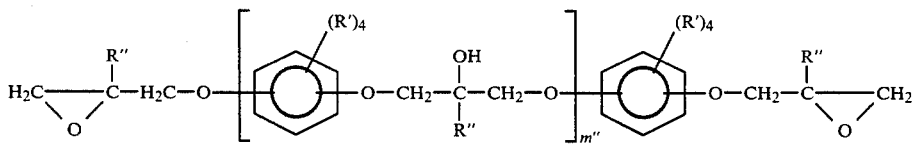

V.

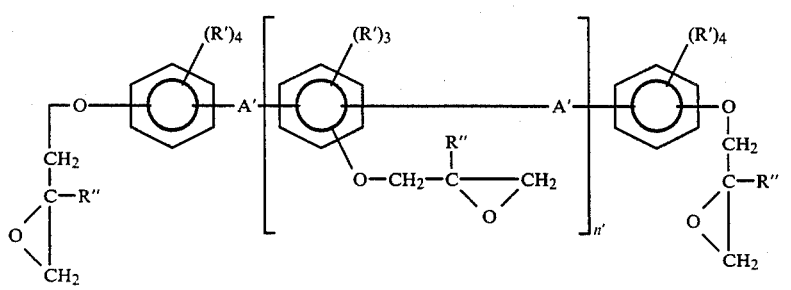

VI.

VII.

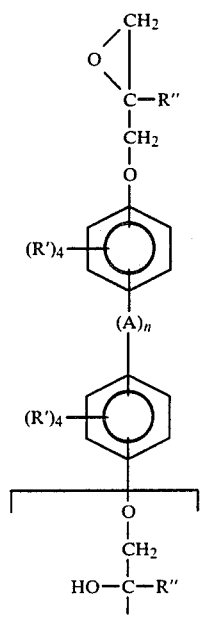

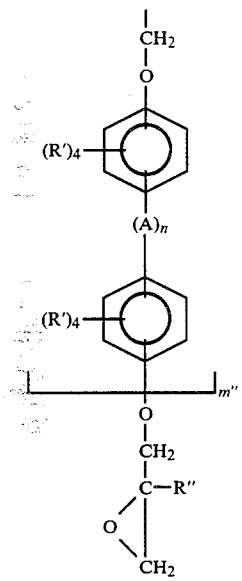

VIII.

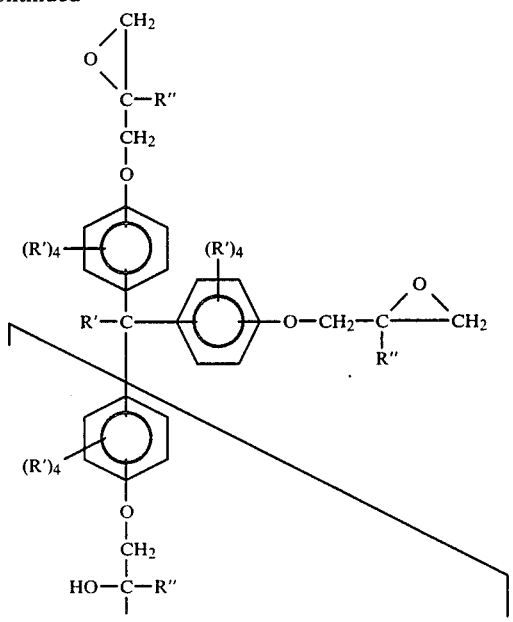

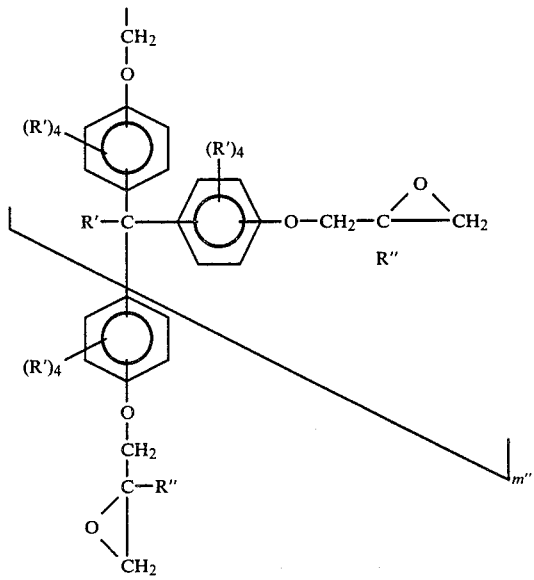

wherein A, A', R', m, n and n' are as herein before defined, R" is independently hydrogen or a hydrocarbyl group having from 1 to about 3 carbon atoms, and m" has a value of 0 to about 40, preferably about 0.1 to about 10. Said epoxy resins are used in the co-oligomerization reaction with the cyanate mixture so as to provide a mole ratio of epoxy groups

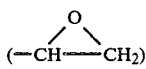

to cyanate groups (—O—C≡N) of about 1 to 10 to about 1 to 100 or more with mole ratios of about 1 to 15 to about 1 to 40 being preferred.

The aforementioned operating conditions and catalysts which are used in the trimerization reaction, are also employed for co-oligomerization of the cyanate mixture with an epoxy resin to provide oligomers containing both triazine and oxazoline groups.

Although the co-oligomerization of the cyanate mixture with an epoxy resin provides both triazine and oxazoline groups or functionality in the oligomers produced, it is felt that other reactions may also be occurring. Unreacted phenolic groups may copolymerize with a portion of the epoxide groups of the epoxy resin during the co-oligomerization reaction. Ring opening products derived from the oxazoline structure may also be formed.

(c) Oligomers Containing Triazine and Imino Carbamate Groups

Oligomer compositions containing both triazine groups and imino carbamate linkages are prepared by (I) reacting (A) at least one material having an average of more than one aromatic hydroxyl groups per molecule with (B) at least 0.01 but not more than 0.95, preferably from about 0.05 to about 0.55 mole of at least one cyanogen halide per aromatic hydroxyl group in the presence of (C) a suitable base in a quantity of from about 0.01 to about 1.1, preferably from about 0.05 to about 0.6, mole of a suitable base per aromatic hydroxyl group at a temperature and time sufficient to essentially complete the reaction and thereafter recovering the resultant cyanate mixture; and (II) co-oligomerizing the product resulting from
(I) by reacting with
(D) an aromatic polyamine in an amount which provides a mole ratio of amine groups to cyanate groups of from about 1:8 to about 1:100, preferably from about 1:12 to about 1:50 optionally in the presence of
(E) a suitable co-oligomerization catalyst and at a temperature and time to essentially complete the co-oligomerization reaction.

Suitable aromatic polyamines for co-oligomerization with the cyanate mixture are those represented by formula I, II, III, and IV wherein Q is an —NH$_2$ group and A, A', R', m', n, n' and p are as hereinbefore defined. Aromatic polyamines wherein Q is an

group and R is a hydrocarbyl group having from 1 to about 10 carbon atoms, a phenyl group or an alkylaryl group may also be used in the co-oligomerization reaction although they are less preferred.

Particularly suitable aromatic amine-containing compounds include, for example, o-, m- and p-diaminobenzene, 2-tert-butyl-1,4-diaminobenzene, 2,4-dimethyl-1,3-diaminobenzene, 2,5-di-tert-butyl-1,4-diaminobenzene, 2,3,5,6-tetramethyl-1,4-diaminobenzene, 2,4,6-trimethyl-1,3-diaminobenzene, 4-chloro-1,3-diaminobenzene, 4-tert-butyl-1,2-diaminobenzene, 1,1-bis(4-aminophenyl)-ethane, 2,2-bis(4-aminophenyl)propane, 2,2-bis(4-aminophenyl)pentane, bis(4,4'-diaminophenyl)mathane, 4,4'-diaminodiphenyl, 2,2'-diaminophenyl, 3,3',5,5'-tetra methyl-4,4'-diaminodiphenyl, 3,3',5,5'-tetrachloro-4,4'-diaminodiphenyl, 3,3',5,5'-tetrachloro-2,2'-diaminodiphenyl, 2,2'-6,6'-tetrachloro-4,4'-diaminodiphenyl, 4,4'-bis([3-amino]phenoxy)diphenyl, 4,4'-bis([4-amino]phenoxy)diphenyl, 2,2'-diamino-1,1'-binaphthyl, and other diaminodiphenyls; 4,4'-diaminodiphenyl ether, 3,3',5,5'-tetramethyl-4,4'-diaminodiphenyl ether, 3,3',5,5'-tetrachloro-4,4'-diaminodiphenyl ether, 4,4'-bis(p-aminophenoxy)diphenyl ether, 4,4'-bis(p-aminophenyl isopropyl)diphenyl ether, 4,4'-bis(p-aminophenoxy)benzene, 4,4'-bis(p-aminophenoxy)diphenyl ether, 4,4'-bis(4-[4-aminophenoxy]phenyl sulfone)diphenyl ether, and other diaminodiphenyl ethers; 4,4'-diaminodiphenyl sulfone, 3,3',5,5'-tetramethyl-4,4'-diaminodiphenyl sulfone, 3,3', -5,5'-tetrachloro-4,4'-diaminodiphenyl sulfone, 4,4'-bis(p-aminophenyl isopropyl)diphenyl sulfone, 4,4'-bis([4-amino]-phenoxy)diphenyl sulfone, 4,4'-bis([3-amino]phenoxy)diphenyl sulfone, 4,4'-bis(4-[4-aminophenylisopropyl]-phenoxy)diphenyl sulfone, 4,4'-bis(4-[4-amino]diphenoxy)diphenyl sulfone, and other diphenyl sulfones; 4,4'-diaminodiphenyl methane, 4,4'-bis(p-aminophenyl)diphenyl methane, 2,2'-bis(p-aminophenyl)-propane, 3,3',5,5'-tetramethyl-2,2'-bis(p-aminophenyl)propane, 3,3',5,5'-tetrachloro-2,2'-bis-(p-aminophenyl)propane, 1,1-bis(p-aminophenyl)cyclohexane, bis-(2-amino-1-naphthyl)-methane, 1,2-bis(p-aminophenyl)-1,1,2,2-tetramethylethane, 4,4'-diaminobenzophenone, 4,4'-bis(4-amino)phenoxybenzophenone, 1,4-bis(p-aminophenyl isopropyl)benzene, 2,2',5,5'-tetraaminodiphenyl sulfone, other diaminodiphenyl alkanes, tris(aminophenyl)methane, tris(4-amino-2-bromophenyl)methane, other tris(aminophenyl)alkanes, mixtures thereof and the like.

The co-oligomerization reaction is usually conducted at a temperature of from about 70° C. to about 250° C., preferably from about 70° C. to about 200° C. for a period of from about 15 minutes (900 x) to about 240 minutes (14400 s), preferably from about 30 minutes (1800 s) to about 120 minutes (7200 s). The co-oligomerization reaction is preferably performed in the presence of the aforementioned catalyst(s) used in the trimerization reaction.

The cyanate mixture and aromatic polyamine are thoroughly blended to provide a homogeneous mixture prior to the co-oligomerization reaction. This is accomplished either by grinding or blending the cyanate mixture and aromatic polyamine or, preferably, by dispersing or dissolving or slurring said cyanate mixture and aromatic polyamine in an inert solvent followed by devolatilization to remove said solvent. Suitable inert solvents include, for example, chlorinated hydrocarbons and aromatic hydrocarbons.

(d) Oligomers Containing Triazine and at least one other N-heterocyclic group

Oligomer compositions containing both triazine groups and at least one other N-heterocyclic group are prepared by (I) reacting at a temperature and time sufficient to essentially complete the reaction of
(A) at least one material having an average of more than one aromatic hydroxyl group per molecule with
(B) at least 0.01 but not more than 0.95, preferably from about 0.05 to about 0.55 mole of at least one cyanogen halide per aromatic hydroxyl group in the presence of
(C) from about 0.01 to about 1.1, preferably from about 0.05 to about 0.6 moles of a suitable base per aromatic hydroxyl group and thereafter recovering the resultant cyanatecontaining mixture; and (II) co-oligomerizing the product resulting from (I) with
(D) a polymaleimide in an amount which provides a mole ratio of maleimide groups to cyanate groups of from about 0.01:1 to about 1:1, preferably from about 0.025:1 to about 0.1:1 optionally in the presence of
(E) a suitable co-oligomerization catalyst and at a temperature and time to essentially complete the co-oligomerization reaction.

Suitable polymaleimides for co-oligomerization with the cyanate mixture which can be employed herein include, for example, those represented by the formulas

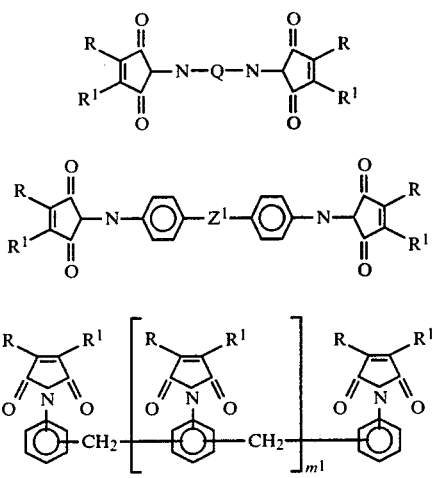

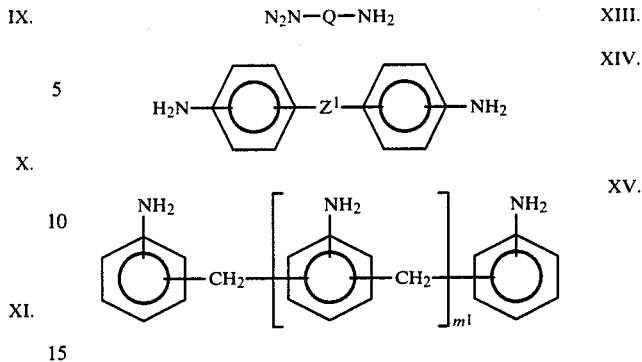

wherein $Z^1$ is independently a direct bond, an alkylene group having from 1 to about 5 carbon atoms, —S—, —S—S—,

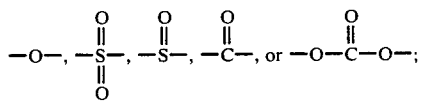

each R and $R^1$ is independently hydrogen or a hydrocarbyl group having from 1 to about 3 carbon atoms; Q is a divalent alkyl radical having 2 to about 12 carbon atoms and $m^1$ has a value of 0.02 to about 10.

Typical polymaleimides represented by formulas IX, X, and XI include, N,N'-ethylenebismaleimide, N,N'-ethylenebis(2-methylmaleimide), N,N'-hexamethylenemaleimide, N,N'-(oxydi-p-phenylene)bismaleimide, N,N'-(methylenedi-p-phenylene)bis-maleimide, N,N'-(methylenedi-p-phenylene)bis(2-methylmaleimide), N,N'-(thiodi-p-phenylene)bismaleimide, N,N'-(sulfonyldi-m-phenylene)-bismaleimide, N,N'-(isopropylidenedi-p-phenylene)bismaleimide, polymethylene polyphenylene polymaleimides and the like. The ploymaleimides may be used either alone or in any combination.

The polymaleimides can be prepared by reacting a stoichiometric quantity of a maleic anhydride per amine group of a polyamine in the presence of a suitable solvent.

Suitable maleic anhydrides include, for example, those represented by the formula

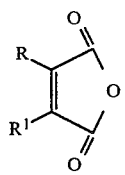

wherein R and $R^1$ are as hereinbefore defined.

Suitable maleic anhydrides include maleic anhydride, methyl maleic anhydride, mixtures thereof and the like. Most preferred as the maleic anhydride is maleic anhydride, per se.

Suitable polyamines which can be employed to prepare the polymaleimides include, for example, those represented by the formulas wherein Q, $Z^1$ and $m^1$ are as hereinbefore defined.

Suitable polyamines include 1,4-diamino-butane, dodecyl diamine, 1,6-hexane diamine, 2-methyl-4-ethyl-1,8-diaminooctane, methylene dianiline, diamino-diphenyl ether, anilineformaldehyde condensation products, mixtures thereof and the like.

Suitable solvents include aromatic hydrocarbons, chlorinated hydrocarbons, N,N-dimethylformamide and the like. Most preferred solvents are N,N-dimethylformamide, chloroform and toluene. The polymaleamic acid resulting from reaction of a maleic anhydride and a polyamine may be isolated then dehydrated to the desired polymaleimide. Alternately, the reaction may be performed in a single continuous step. Detailed procedure for preparing polymaleimides can be found in U.S. Pat. Nos. 2,462,835 and 2,444,536.

The co-oligomerization reaction is usually conducted at a temperature of from about 70° C. to about 250° C., preferably from about 70° C. to about 200° C. for a period of from about 30 minutes (1800 s) to about 240 minutes (14,400 s), preferably from about 60 minutes (3600 s) to about 120 minutes (7200 s). The co-oligomerization reaction is preferably performed in the presence of the aforementioned catalyst(s).

The cyanate mixture and polymaleimide are thoroughly blended to provide a homogeneous mixture prior to co-oligomerization reaction. This is accomplished either by grinding or blending the solid cyanate mixture and polymaleimide or, preferably, by dispersing or dissolving or slurring said polymaleimide in a molten solution of cyanate mixture.

Co-oligomerization of the cyanate mixture with a polymaleimide can lead to a complex variety of structures including the cyanate group homopolymerization structure (triazine)

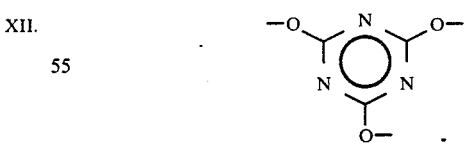

the maleimide group homopolymerization structure

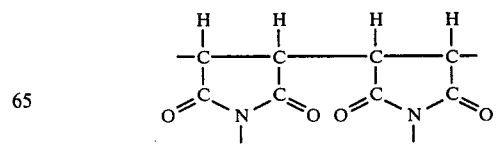

and cyanate group and maleimide group copolymerization structures such as, for example,

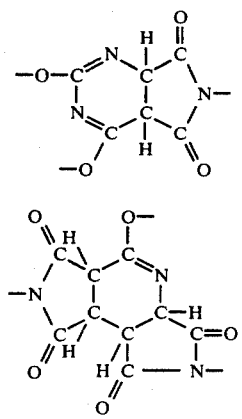

The term "N-heterocyclic group" as used herein shall mean any of the structures formed in the reaction of the cyanate group and maleimide group other than triazine.

Alkoxylation of the Oligomer

The hydroxy aromatic oligomers containing triazone groups are alkoxylated by reaction with an alkylene oxide or mixture of alkylene oxides. Suitable alkylene oxides include ethylene oxide, propylene oxide, 1,2-butylene oxide, 2,3-butylene oxide, isobutylene oxide, cyclohexene oxide, norbornene oxide, styrene oxide, mixtures thereof and the like. Most preferred as the alkylene oxide are ethylene oxide and propylene oxide. The components are employed in proportions which provide a ratio of epoxide groups to hydroxy groups of from about 0.1:1 to about 200:1, preferably from about 1:1 to about 50:1.

The alkoxylation reaction is usually conducted at a temperature of from about 25° C. to about 200° C., preferably from about 100° C. to about 175° C. for from about 60 minutes (3600 s) to about 24 hours (86,400 s), preferably from about 6 hours (21,600 s) to about 16 hours (57,000 s). The reaction is typically conducted under autogeneous pressure although, higher pressures may be used by addition of an inert gas such as nitrogen or argon to the reaction.

If desired, the reaction can be conducted in the presence of a catalyst. Suitable catalysts include the alkali metal hydroxides and alkaline earth hydroxides, for example, potassium hydroxide, sodium hydroxide, calcium hydroxide mixtures theref and the like. Lewis acid catalysts such as boton trifluoride or its etherate may also be employed.

If desired, the reaction can be conducted in the presence of an inert solvent reaction medium. Suitable solvents include, for example, chlorinated hydrocarbons, aromatic hydrocarbons, aliphatic hydrocarbons, mixtures thereof, and the like.

The resultant oligomers from the alkoxylation reaction with the hydroxy aromatic oligomers are referred to herein as the alkoxylated hydroxy aromatic oligomers containing at least one triazine group. This term includes the alkoxylated hydroxy aromatic oligomers having more than one triazine group [(a) Oligomers Containing Triazine Groups], oligomers having at least one triazine group and at least one oxazoline group which includes the products derived from the oxazoline structure [(b) Oligomers Containing Triazine and Oxazoline Groups], oligomers having at least one triazine group and at least one imino carbamate group [(c) Oligomers Containing Triazine and Imino Carbamate Groups], and oligomers having at least one triazine group and at least one other N-heterocyclic group [(d) Oligomers Containing Triazine Groups and other N-Heterocyclic Groups].

Preparation of Polyurethanes

Polyurethane is produced by the reaction of at least one polisocyanate, usually the diisocyanate, and at least one material having at least two Zerewitinoff active hydrogens. According to the present invention, the materials having at least two Zerewitinoff active hydrogens to produce polyurethanes are the alkoxylated hydroxy aromatic oligomers containing at least one triazine group. It is preferred, in addition to the oligomers of the present invention, to utilize another material having at least two Zerewitinoff active hydrogens such as a polyol, preferably a diol to produce the polyurethanes. While polyols are used to illustrate the polyurethanes which may be produced according to the present invention, polyamines, alkanolamines or polysulfhydryl containing compounds may also be used, either in place of or in addition to the polyols. The polyurethanes produced according to the present invention are therefore characterized as polyurethanes containing two or more triazine groups between the respective urethane functionality or polyurethanes containing the triazine and oxazoline groups which includes the products derived from the oxazoline structure, polyurethanes containing the triazine and imino carbamate groups, or polyurethanes containing the triazine group and at least one other N-heterocyclic group.

The polyurethanes according to the present invention are preferably formulated by utilizing at least one material other than the oligomers of the present invention having at least two Zerewitinoff active hydrogens. While formulations may be broadly within the range of 1 to 99 parts of the oligomers of the present invention to 99 to 1 part of at least one other material having at least two Zerewitinoff active hydrogen, it is preferred that the oligomers of the present invention be utilized in the range of 10 to 75 parts to 90 to 25 of the other material(s). In the most preferred range, the oligomers of the present invention are utilized in the range of 10 to 50 parts as the Zerewitinoff active material whereas 90 to 50 parts are a material other than the oligomers of the present invention.

Suitable materials which can be optionally employed herein to prepare the polyurethanes containing a triazine group, or both triazine and oxazoline, triazine and imino carbamate, or triazine and other N-heterocyclic groups are the polyols which include both diols, which are preferred and other polyols, tri-, tetra-, etc. or mixtures thereof. Suitable diols are from the class of those having the formula: HO—R—OH where R is a divalent organic radical selected from the group consisting of alkylene, ether-linked alkylene, ether-linked arylene, cycloalkylene, polycycloalkylene, bis(alkyl)cycloalkylene, bis(alkyl)polycycloalkylene, alkylarylene, and arylene.

Suitable such polyols are from the class of those having the formula: HO—R$^1$—OH where R$^1$ is a divalent organic radical selected from the group consisting of mono, di, tri or tetra hydroxy alkylene; mono, di, tri or tetra hydroxy ether linked alkylene; mono or di hydroxy cycloalkylene and mono or dihydroxy polycycloalkylene.

Representative of the useful diols are: ethylene glycol, propylene glycol, diethylene glycol, dipropylene glycol, polypropylene or ethylene glycols with average molecular weights from about 400 to about 4,000, dicyclopentadiene dimethanol, bis(hydroxymethyl)norbornane, methyl cyclohexanedimethanol, bis(hydroxypropyl)bisphenol A and other alkoxylated bisphenols. Mixtures of two or more of such diols can also be used.

Representative of the useful polyols are: pentaerythritol, glycerine, sorbitol, trimethylolpropane, alkoxylated phenol-formaldehyde condensation products (novolac), tetra(hydroxymethyl)butane, and mono, di or poly alkoxylated derivatives thereof. Mixtures of two or more of such polyols can also be used.

Suitable materials having more than one isocyanate group per molecule which can be employed herein are polyisocyanates which include both diisocyanates, and di or polyisocyanate prepolymers. These materials are typically employed in proportions which provide a ratio of isocyanate groups to hydroxyl groups of from about 0.95:1.0 to about 1.5:1.0 to provide the polyurethane product. These materials and their preparation are described in the *Encyclopedia of Chemical Technology*, 3rd edition, volume 13, pages 789-818 published by John Wiley and Sons (1981) which is incorporated herein by reference.

Suitable reaction conditions, reaction times and catalysts for preparation of the polyurethane compositions of the present invention are described in the *Encyclopedia of Chemical Technology*, 3rd edition, volume 23, pages 576-608 published by John Wiley and Sons (1983) which is incorporated herein by reference. A preferred method for utilizing the alkoxylated hydroxyaromatic oligomers containing at least one triazine group or both triazine and oxazoline, triazine and iminocarbamate, or triazine and other N-heterocyclic groups involves reacting said oligomers, optionally containing one or more polyol(s), with a stoichiometric excess of a material having more than one isocyanate group per molecule. A preferred range of from about 1.25:1 to about 10:1, most preferably from about 1.5:1 to about 4:1 moles of isocyanate per aliphatic hydroxyl group is employed to prepare said prepolymers. The resultant product is an isocyanate prepolymer in excess di or polyisocyanate and as such is used as a material having more than one isocyanate group per molecule for subsequent use in polyurethane-forming reactions.

In certain other processes which will be readily apparent to the skilled artisan, a substantially less than stoichiometric amount of a material having more than one isocyanate group per molecule and the alkoxylated hydroxyaromatic oligomers containing at least one triazine group or both triazine and oxazoline, triazine and iminocarbamate, or triazine and other N-heterocyclic groups and, optionally, one or more polyol(s), are reacted to provide a hydroxyl functional prepolymer. A preferred range of from about 0.05:1 to about 0.50:1, most preferably 0.10:1 to about 0.30:1 moles of isocyanate per aliphatic hydroxyl group is typically employed to prepare said hydroxyl functional prepolymers. The resultant hydroxyl functional prepolymer product is then used as a polyol in polyurethane-forming reactions or may be reacted with additional material having more than one isocyanate group per molecule in the aforementioned manner to provide an isocyanate prepolymer.

The alkoxylated hydroxy aromatic oligomers containing at least one triazine group or both triazine and oxazoline, triazine and imino carbamate, or triazine and other N-heterocyclic groups may be varied over a wide range of functional group content, molecular weight distribution and the like to provide polyurethane products possessing a variety of physical and mechanical properties. As a specific example, increasing the mole ratio of cyanate groups to phenolic hydroxyl groups in the cyanate mixture precursor leads to a hydroxy aromatic oligomer possessing increased triazine group content and decreased phenolic hydroxyl group content accompanied by increased molecular weight and functionality. Incorporation of the alkoxylate of this oligomer tends to provide a polyurethane with increased heat distortion temperature and rigid plasticd mechanical behavior.

Increasing the mole ratio of epoxy groups amine groups, or malemide groups to cyanate groups in the epoxy resin, polyamine or polymaleimide admixed with the cyanate mixture precursor leads to a hydroxy aromatic oligomer possessing increased oxazoline group content, imino carbamate group content or non-triazine N-heterocyclic group content, respectively, and decreased triazine group content. Incorporation of the alkoxylate of any of these oligomers tends to provide a polyurethane with increased mechanical strength (higher tensile strength, flexural strength and impact resistance).

The extent of alkoxylation of the hydroxy aromatic oligomer also influences the properties of the polyurethane product. Use of a relatively low mole ratio of alkylene oxide epoxide groups to hydroxy aromatic oligomer phenolic hydroxyl groups, such as, for example, about 0.1:1 to about 10:1, generally favors production of a rigid polyurethane with excellent overall mechanical properties and an enhanced heat distortion temperature. Use of a relatively high mole ratio of alkylene oxide epoxide groups to hydroxy aromatic oligomer phenolic hydroxyl groups, such as, for example, about 50:1 to about 200:1, generally favors production of a more elastic or rubber-like polyurethane. Aside from the extent of alkoxylation, the type of alkylene oxide used can influence both physical and mechanical properties. For example, use of ethylene oxide provides an alkoxylated hydroxy aromatic oligomer containing primary hydroxyl groups whereas use of propylene oxide provides an alkoxylated hydroxy aromatic oligomer containing secondary hydroxy groups. The differential reactivity of the aforementioned two types of hydroxyl groups with polyisocyanates is well documented in the polyurethane literature.

All of the above variations in the alkoxylated hydroxy aromatic oligomer component can also be utilized to modify numerous other properties, such as, for example, processability and rheology. This high degree of versatility is especially beneficial to certian types of processing used to produce polyurethanes, such as reactive injection molding (RIM).

The polyurethanes of the present invention may be cellular (foam) or non-cellular and may contain fillers, pigments, dyes, mold release agents, reinforcing materials, other additives and the like.

The compositions of the present invention are useful in the preparation of castings, moldings, coatings, structural foams, flexible foams, insulation, and the like.

The following examples are illustrative of the invention, but are not to be construed as to limiting the scope thereof in any manner.

EXAMPLE 1

A. Preparation of Diphenol Cyanate Mixture

Cyanogen bromide (1.10 moles, 119.5 grams) was added to a reactor containing stirred acetone (350 milliliters) under a nitrogen atomosphere. The cyanogen bromide-acetone solution was cooled to −5° C., then bisphenol A (2.00 moles, 456.6 grams) was added to the reactor. The stirred solution was allowed to equilibrate to −5° C. then triethylamine (1.00 mole, 101.2 grams) was added to the reactor dropwise in order to maintain a reaction temperature of less than 0° C. After completion of the triethylamine addition, the reactor was maintained at −5° C. to 0° C. for an additional 20 minutes (1200 s), followed by the addition of the reaction product to chilled water (4 liters) with agitation. After 45 minutes (2700 s), the mixture of water and product was subjected to multiple extractions with dichloromethane. The combined dichloromethane extracts were sequentially washed with dilute hydrochloric acid (5 percent), and water, and then dried over anhydrous sodium sulfate. The dry dichloromethane solution was filtered and solvent removed by rotary evaporation under vacuum. The resultant diphenol cyanate mixture (442.3 grams) was recovered as a transparent, viscous liquid. Infrared, spectrophotometric analysis demonstrated the presence of the nitrile functionality and unreacted hydroxy functionality. Liquid chromatographic analysis demonstrated the mixture was bisphenol A 52.46 area percent; bisphenol A monocyanate, 39.87 area percent; and bisphenol A dicyanate, 7.68 area percent.

B. Trimerization of Diphenol Cyanate Mixture

The bisphenol cyanate mixture (442.3 grams) was thoroughly mixed with (6.0 percent) cobalt naphthenate (0.10 percent by weight, 0.47 gram), and the mixture was heated in a glass tray in a convection type oven at 177° C. For 2 hours (7200 s). The hydroxyaromatic oligomer mixture containing triazine groups was recovered in quantitative yield as a transparent, brittle solid at 25° C. and a viscous liquid at 177° C. An amber to blue-green color of the oligomer was present due to the catalyst. Infrared spectroscopic analysis demonstrated the absence of cyanate functionality, and the presence of triazine and hydroxyl functionalities.

C. Propoxylation of Hydroxy Aromatic Oligomers Containing Triazine Groups

A portion (350.0 grams) of the hydroxyaromatic oligomers containing triazine groups from B above, 1,2-epoxypropane (4.7 moles, 277 grams), and powdered potassium hydroxide (200 milligrams) were placed in a Parr stirred pressure reactor. The reactor was sealed and purged with nitrogen. The reaction proceeded under nitrogen (3.5 kilo grams per cm$^2$ at 20° C.) at 100° C. for 15 hours (54,000 s).

EXAMPLE 2

The propoxylated triazine functional oligomers (600 grams) from Example 1 were mixed with a polypropylene glycol of an average molecular weight of 425 (Polyglycol P-425, Dow Chemical Co.) (750 grams) and lead octoate (3.375 grams, 0.25% by weight). A urethane was formed from the polyol/catalyst mixture (93 grams) and bis(4,4'-isocyanatophenyl)methane (MDI) (63 grams) by reaction injection molding. Injection pressure: 2,000 psi; reaction time 2.3 s; mold temperature 76° C.; mold time 4 minutes (240 s). Test pieces were cut after an aging time of not less than 48 hours.

Mechanical properties of four tensile and four flexural test pieces were determined using an Instron machine with standard test methods (ASTM D-638 and D-790). Heat distortion temperature of two clear casting test pieces was determined using an Aminco Plastic Deflection Tester (American Instrument Co.) with standard test method (ASTM D-648 modified). The results are reported in Table I.

TABLE I

| | |
|---|---|
| Heat Distortion Temperature, °F. | 131° F. |
| Tensile Strength, psi | 6,582 |
| Elongation (%) | 1.84 |
| Flexural Strength, psi | 13,502 |
| Flexural Modulus, psi | 434,000 |

EXAMPLE 3

Ethoxylation of Hydroxyaromatic Oligomers Containing Triazine Groups

The diphenol cyanate mixture of Example 1-A was scaled up three-fold. The resulting diphenol cyanate mixture was trimerized using the method of Example 1-B to provide a hydroxyaromatic oligomer mixture containing triazine groups. A portion (1151 grams) of the hydroxyaromatic oligomer mixture containing triazine groups was reacted with ethylene oxide at 150° C. and 30 psi to add a total of 500 grams of ethylene oxide. The resulting ethoxylated triazine functional oligomers possessed a 210° F. viscosity of 100.2 cks and a weight percent hydroxyl content of 10.18.

EXAMPLE 4

The ethoxylated triazine functional oligomers were used to prepare a high density foam molded part by reaction injection molding. The following formulation was employed:

| | Parts (grams) |
|---|---|
| B-Side | |
| VORANOL 800 | 43 |
| Jeffamine T-5000 | 25 |
| Ethoxylated Triazine Functional Oligomer | 17 |
| Fomerez UL-28 (wt % B-Side less Freon 11) | 0.01 |
| Freon 11 | 9.5 |
| A-Side | |
| Rubinate M (poly MDI) | 104.8 |

The above-identified materials are:

VORANOL 800 is an adduct of aminoethylethanolamine and 3 moles of propylene oxide.

Jeffamine T-5000 is a primary amine-terminated poly (propylene oxide) having an equivalent weight of about 1,650.

Fomrez UL-28 is an organo tin salt commercially available from Witco Chemical Company.

Freon 11 is trichlorofluromethane.

Rubinate M is a polymerized (MDI) diphenylmethane diisocyanate.

The reaction injection molding machine used was a Martin-Sweets mini-RIM machine with the following processing conditions:

| | | |
|---|---|---|
| Throughput | | 0.5 lb/sec |
| Component Temperatures: | A-Side | 100° F. |
| | B-Side | 100° F. |
| Mix Pressure: | A-Side | 2000 psi |
| | B-Side | 2000 psi |

-continued

| Initial Mold Temperature | 150° F. |
|---|---|
| Demold Time | 2 minutes |

Test pieces were prepared from the molded part and evaluated using the method of Example 2. The Gardner impact strength was determined using standard test methods (ASTM D-329). The results are reported in Table II. The heat distortion temperature was normalized to a density of 0.92 gm/cc.

COMPARATIVE EXPERIMENT 1

A high density foam molded part was prepared by reaction injection molding from the following formulation:

|  | Parts (grams) |
|---|---|
| VORANOL 800 | 50 |
| Jeffamine T-5000 | 25 |
| Fomrez UL-28 (wt % B-Side less Freon 11) | 0.01 |
| Freon 11 | 9.0 |
| Rubinate M (poly MDI) | 104.8 |

Test pieces were prepared and evaluated using the method of Example 2. The results are reported in Table II. The heat distortion temperature is normalized to a density of 0.92 gm/cc.

TABLE II

|  | Example 3 | Comparative Experiment 1 |
|---|---|---|
| Density, gm/cc | 0.85 | 0.84 |
| Flexural Modulus, psi | 177,147 | 150,000 |
| Flexural Strength, psi | 7003 | 5824 |
| Tensile Strength, psi | 4468 | 4061 |
| Elongation, % | 4.4 | 4.4 |
| Gardner Impact Strength, in-lb | 33 | 35 |
| 264 psi Heat Distortion Temperature, °F. | 166 | 160 |

Although the invention is described with respect to specific embodiments and modifications, the details hereof are not to be construed as limitations except to the extent indicated in the following claims.

What is claimed is:

1. An oligomer prepared by
   I. reacting
      (A) at least one material having an average of more than one aromatic hydroxyl group per molecule with
      (B) at least 0.01 but not more than 0.95 mole of at least one cyanogen halide per aromatic hydroxyl group in the presence of
      (C) a suitable base in a quantity of from about 0.01 to about 1.1 moles per aromatic hydroxyl group at a temperature and time sufficient to essentially complete the reaction and thereafter recovering the resultant cyanate mixture; and
   II. trimerizing the product resulting from (I) in the presence of a suitable trimerization catalyst at a temperature and time to essentially complete the trimerization reaction whereby an oligomer containing the triazine group is produced, and
   III. reacting said oligomer with at least one alkylene oxide in proportions which provide a ratio of epoxide groups to hydroxy groups of from about 0.1:1 to about 200:1.

2. An oligomer prepared by
   I. reacting
      (A) at least one material having an average of more than one aromatic hydroxyl group per molecule with
      (B) at least 0.01 but not more than 0.95 mole of at least one cyanogen halide per aromatic hydroxyl group in the presence of
      (C) a suitable base in a quantity of from about 0.01 to about 1.1 moles per aromatic hydroxyl group at a temperature and time sufficient to essentially complete the reaction and thereafter recovering the resultant cyanate mixture; and
   II. co-oligomerizing the product resulting from (I) by reacting with
      (D) an epoxy resin wherein the mole ratio of epoxy groups to cyanate groups is from about 1:10 to about 1:100 in the presence of a suitable co-oligomerization catalyst at a temperature and time to essentially complete the co-oligomerization reaction whereby an oligomer containing both the triazine group and the oxazoline group is produced, and
   III. reacting said oligomer with at least one alkylene oxide in proportions which provide a ratio of epoxide group to hydroxy groups of from about 0.1:1 to about 200:1.

3. An oligomer prepared by
   I. reacting
      (A) at least one material having an average of more than one aromatic hydroxyl groups per molecule with
      (B) at least 0.01 but not more than 0.95 mole of at least one cyanogen halide per aromatic hydroxyl group in the presence of
      (C) a suitable base in a quantity of from about 0.01 to about 1.1 moles per aromatic hydroxyl group at a temperature and time sufficient to essentially complete the reaction and thereafter recovering the resultant cyanate mixture; and
   II. co-oligomerizing the product resulting from (I) by reacting with
      (D) an aromatic polyamine in an amount which provides a mole ratio of amine groups to cyanate groups of from about 1:8 to about 1:100 in the presence of a suitable co-oligomerization catalyst and at a temperature and time to essentially complete the co-oligomerization reaction whereby an oligomer containing both the triazine group and the imino carbamate group is produced, and
   III. reacting said oligomer with at least one alkylene oxide in proportions which provide a ratio of epoxide group to hydroxy groups of from about 0.1:1 to about 200:1.

4. An oligomer prepared by
   I. reacting
      (A) at least one material having an average of more than one aromatic hydroxyl groups per molecule with
      (B) at least 0.01 but not more than 0.95 mole of at least one cyanogen halide per aromatic hydroxyl group in the presence of
      (C) a suitable base in a quantity of from about 0.01 to about 1.1 moles per aromatic hydroxyl group at a temperature and time sufficient to essentially complete the reaction and thereafter recovering the resultant cyanate mixture; and
   II. co-oligomerizing the product resulting from (I) with
(D) a polymaleimide in an amount which provides a mole ratio of maleimide groups to cyanate groups of from about 0.01:1 to about 1:1 in the presence of a suitable co-oligomerization catalyst and at a temperature and time to essentially complete the co-oligomerization reaction whereby an oligomer containing both the triazine group and another N-heterocyclic group is produced, and III. reacting said oligomer with at least one alkylene oxide in proportions which provide a ratio of epoxide group to hydroxy groups of from about 0.1:1 to about 200:1.

5. A polyurethane characterized by containing more than one triazine group between urethane linkages.

6. A polyurethane characterized by containing a triazine group and an oxazoline group.

7. A polyurethane characterized by containing a triazine group and an imino carbamate group.

8. A polyurethane characterized by containing a triazine group and another N-heterocyclic group.

9. A polyurethane prepared by reacting the oligomer of claim 1 with at least one material having more than one isocyanate group per molecule.

10. A polyurethane prepared by reacting the oligomer of claim 2 with at least one material having more than one isocyanate group per molecule.

11. A polyurethane prepared by reacting the oligomer of claim 3 with at least one material having more than one isocyanate group per molecule.

12. A polyurethane prepared by reacting the oligomer of claim 4 with at least one material having more than one isocyanate group per molecule.

13. A polyurethane prepared by reacting the oligomer of claim 1 with at least one other material having at least two Zerewitinoff active hydrogens and at least one material having more than one isocyanate group per molecule.

14. A polyurethane according to claim 13 wherein the oligomer is present in the range of 10 to 75 parts to 90 to 25 parts by weight of the other material(s).

15. A polyurethane according to claim 13 wherein said other materials having at least two Zerewitinoff active hydrogens are an adduct of aminoethylethanolamine and a primary amine-terminated poly (propylene oxide).

16. A polyurethane according to claim 13 wherein said oligomer is prepared from a cyanate mixture of bisphenol A.

17. A polyurethane according to claim 13 wherein said material having more than one isocyanate group is polymerized diphenylmethane diisocyanate (MDI).

18. A polyurethane prepared by reacting the oligomer of claim 2 with at least one other material having at least two Zerewitinoff active hydrogens and at least one material having more than one isocyanate group per molecule.

19. A polyurethane according to claim 18 wherein the oligomer is present in the range of 10 to 75 parts to 90 to 25 parts by weight of the other material(s).

20. A polyurethane according to claim 18 wherein said other materials having at least two Zerewitinoff active hydrogens are an adduct of aminoethylethanolamine and a primary amine-terminated poly (propylene oxide).

21. A polyurethane according to claim 18 wherein said oligomer is prepared from a cyanate mixture of bisphenol A.

22. A polyurethane prepared by reacting the oligomer of claim 3 with at least one other material having at least two Zerewitinoff active hydrogens and at least one material having more than one isocyanate group per molecule.

23. A polyurethane according to claim 22 wherein the oligomer is present in the range of 10 to 75 parts to 90 to 25 parts by weight of the other material(s).

24. A polyurethane according to claim 22 wherein said other materials having at least two Zerewitinoff active hydrogens are an adduct of aminoethylethanolamine and a primary amine-terminated poly (propylene oxide).

25. A polyurethane according to claim 22 wherein said oligomer is prepared from a cyanate mixture of bisphenol A.

26. A polyurethane prepared by reacting the oligomer of claim 4 with at least one other material having at least two Zerewitinoff active hydrogens and at least one material having more than one isocyanate group per molecule.

27. A polyurethane according to claim 26 wherein the oligomer is present in the range of 10 to 75 parts to 90 to 25 parts by weight of the other material(s).

28. A polyurethane according to claim 26 wherein said other materials having at least two Zerewitinoff active hydrogens are an adduct of aminoethylethanolamine and a primary amine-terminated poly (propylene oxide).

29. A polyurethane according to claim 26 wherein said oligomer is prepared from a cyanate mixture of bisphenol A.

* * * * *